Sept. 10, 1963  J. F. MUMM  3,103,476
FUEL ELEMENT WITH BURNABLE POISON WITHIN THE CLADDING
Filed Dec. 2, 1958
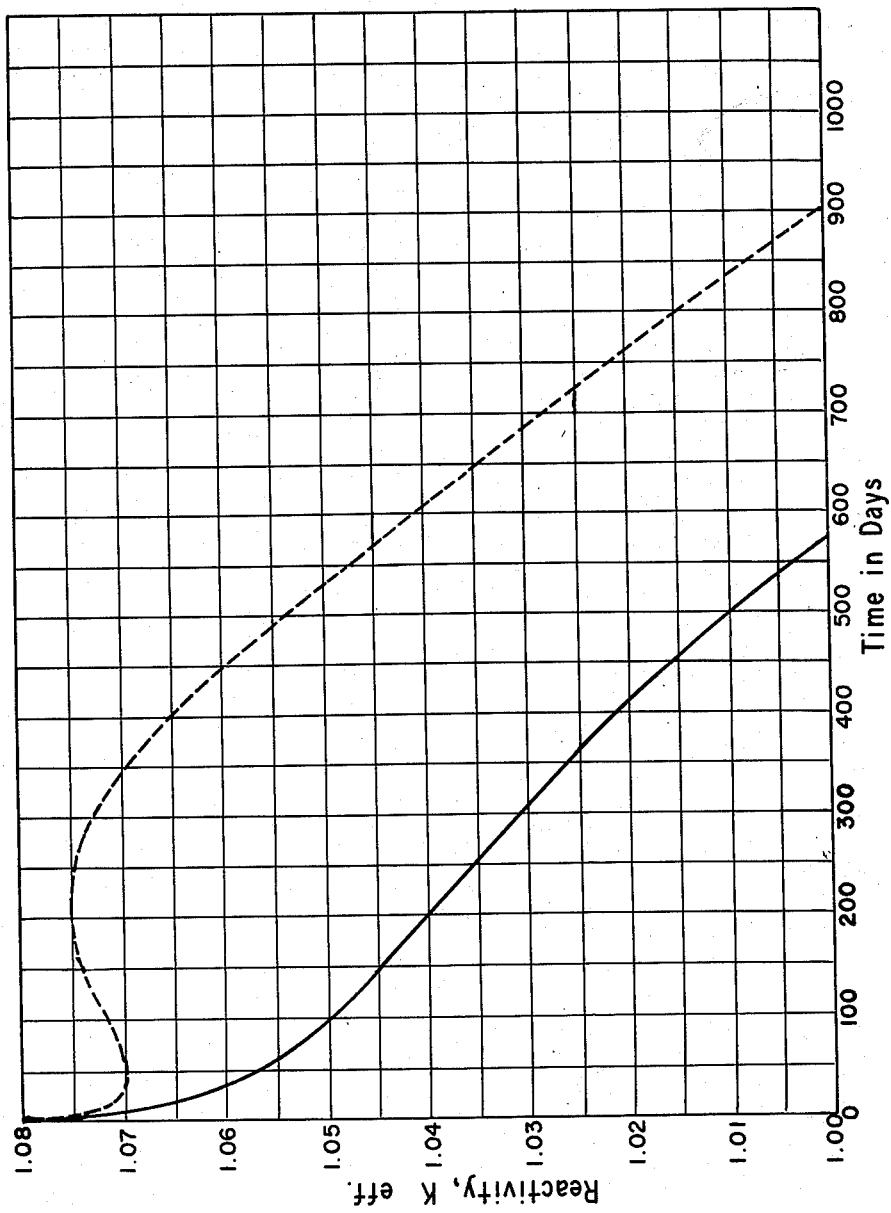
INVENTOR.
John F. Mumm
BY
ATTORNEY

United States Patent Office 3,103,476
Patented Sept. 10, 1963

3,103,476
FUEL ELEMENT WITH BURNABLE POISON WITHIN THE CLADDING
John F. Mumm, Lynchburg, Va., assignor to The Babcock & Wilcox Company, New York, N.Y., a corporation of New Jersey
Filed Dec. 2, 1958, Ser. No. 777,653
2 Claims. (Cl. 204—193.2)

This invention relates to an improved arrangement of a nuclear reactor in which the structural portions of the core contain a predetermined quantity of consumable high cross-section material.

This application is a continuation in part of Serial No. 721,404, filed March 14, 1958, now abandoned.

It is often desirable to place high cross-section materials in the active area of the core of a nuclear reactor to control the excess reactivity necessary to have the reactor operate for a practical length of time between fuel loadings. These high cross-section materials are often referred to as neutron poisons. Typically, each reactor will have some form of neutron poison in a movable control rod to allow insertion or withdrawal of the poison to effect controlled operation or shutting down as the case may be. Certain of the known poisons may be characterized as "burnable poisons" due to their inherent characteristic of losing effectiveness proportionally to the length of time that they are exposed to a reactor neutron flux.

It is sometimes desirable to dispose burnable poisons throughout the volume of the reactor core such that the initial excess reactivity necessarily controlled by the movable control rods is minimized. By this arrangement, the amount of complicated control apparatus necessary for the operation of the reactor is minimized, thus effecting a more economic reactor. A typical example of such a reactor is set forth in the aforementioned copending application Serial No. 721,404.

The function of a burnable poison distributed in a reactor core is to increase the excess loading of fissionable material in order to obtain a longer core lifetime with the same initial excess reactivity. The burnable poison serves the same function as inserted control rods, that is, they hold down excess fuel mass which without the burnable poison would result in excess reactivity. However, as the burnable poison absorbs neutrons, it loses its effectiveness and this process is generally termed "burning out." As the burnable poison can be made to lose its effectiveness at a rate generally proportional to the rate at which the fissionable material is consumed, the excess reactivity of the reactor over a lifetime of the volume can be controlled by the proper selection of the concentration of the burnable poison. The burnable poisons of principal interest have cross sections in the same range as the fissionable material and the concentration is then set so that a fairly flat curve of excess reactivity with time is obtained. If an excessive loading of burnable poison is used, the rate at which the poison burns out may be too great initially compared to that of the burn-up of fuel and a reactivity increase will occur. Thus there are certain critical limits in which burnable poisons may be used.

The present invention comprises purposely providing burnable poison homogeneously distributed throughout the structural non-fuel materials within the active region of the reactor core.

Further, the invention comprises the purposeful provision of the burnable poison in the impervious cladding which encases the fissionable material.

In addition the invention provides that the burnable poison have a neutron cross section equivalent to 200 to 1,000 parts per million of natural boron within the aforesaid structural materials.

As a typical example of the invention reference should be had to the reactor described in the aforesaid application Serial No. 721,404 which is a heterogeneous water moderator thorium converter reactor. In that reactor the fuel is a mixture of uranium and thorium oxides encased in a type 304 stainless steel cladding which is the standard 18% chromium—8% nickel material. The present invention provides as a control for that particular reactor approximately 500 parts per million of natural boron homogeneously mixed in the stainless steel. The addition of boron is made to the steel during the standard process in which the steel is first melted and alloyed in the conventional manner with the desired amount of boron being added after the final deoxidation of the steel. The boron being added as ferroboron or as a natural boron ore. The resulting alloy contains boron as a burnable poison in a fixed relatively impervious matrix and may be worked in the same manner as ordinary stainless steel. In the present embodiment the stainless steel is pierced and drawn into a seamless tube. The only limitation on this process is that in working the alloy after the boron had been added, it should not arise above the temperature of 2200 F. because at point the alloy becomes "hot-short."

The accompanying figure illustrates the reactivity of the reactor plotted vs. operating time in which the dotted line represents the reactivity curve with approximately 500 parts per million of boron in the fuel element cladding and the solid curve shows the same reactor with no boron. Generally, the difference between the values of these two curves is that amount of excess reactivity hold down due to the burnable poison. Thus the requirement for movable control rods is reduced to that extent. It should be noted with respect to the dotted curve that in the initial portion, up to about 50 days, the reactivity of the reactor drops very rapidly and then begins to increase to a maximum at about 200 days. This inversion is a critical factor in determining the quantity of burnable poison that may be inserted within the reactor. It has been determined that the amount of rise and therefore the quantity of burnable poison in the reactor must be limited by the amount of excess reactivity which is initally in the reactor and controllable by the movable control rods.

Thus on the present curve no addition of boron which would result in an excess reactivity of greater than 1.08 would be allowable in the reactor. For the known reactors there would be a practical limit of about 1,000 parts per million equivalent of natural boron which could be placed in the reactor structural materials such as fuel element cladding without exceeding at the same time during the core operation the initial reactivity.

The lower critical value which establishes the range of burnable poison addition is the quantity of poison where the curve inversion begins and for the contemplated types of reactors this would occur at about 200 parts per million of natural boron.

Ordinarily, type 304 stainless steel may contain as much as 60 parts per million of boron which apparently is inherent in the manufacturing process. This small amount of boron is not purposely added and would have practically no effect on the controls of the reactor. From a practical viewpoint the curve for the reactivity of the reactor with the natural occurring quantity of boron in type 304 stainless steel is represented by the solid curve in the accompanying figure. Thus it can be seen that the range of practical value for control purposes (200 and 1000 parts per million equivalent of natural boron) is above that which naturally occurs.

Although natural boron has been used as the standard, it is contemplated that europium may be used in a quantity equivalent to the above specified natural boron content. Equally, enriched boron may be used, for the quantity of these materials is adjusted according to the natural boron specified.

The use of burnable poison in the fuel pin cladding has the particular advantage of placing the burnable poison in a solid naturally non-porous material and restricts the loss of burnable poison by gaseous diffusion. In the case of a volatile burnable poison such as boron, it is extremely difficult to mix the poison with an oxide fuel and retain a controlled quantity of boron therein during the manufacturing process because in the oxide processes now known the compressed oxides are subjected to a high temperature sintering operation during which period the boron gasifies and passes off. An even more serious problem may arise in such a fuel element if it were placed in a reactor. The hottest oxides in the core may approach the melting temperature of the oxide. Under these conditions the burnable poison could be driven by thermal diffusion to regions of cooler area and eventually a significant portion of the burnable poison would be removed from the active core and rest at the end of the fuel tubes. Thus the effectiveness of the poison on restricting the fission process would be considerably reduced and, in fact, may make the reactor uncontrollable with the fixed control rods. Thus, the present invention provides a solution to this problem because at no time could the surface temperature of the fuel element cladding become high enough to cause the diffusion of the natural boron through the cladding without a loss of the entire fuel element.

A further problem in attempting to blend burnable poison with the fuel is that it would be extremely difficult, if not impossible, to mix the oxides and burnable poison in a ratio of about 10,000 to 1 by weight in order to obtain a homogeneous mixture which is necessary for effective reactor operation.

Although the typical embodiment was described with reference to fuel element cladding, it is within the contemplation of the present invention that the poisons could be distributed throughout the actual portion of the core in structural materials other than such cladding. Further, these materials may be zirconium or zirconium-aluminum alloys for power reactors, and for low temperature reactors may be aluminum.

It is contemplated that the invention is useful in water, liquid metal and organic cooled reactors.

While in accordance with the provisions of the statutes, I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

What is claimed is:

1. A nuclear fuel element comprising an impervious non-nuclear cladding, fissionable material encased within said cladding, and said cladding containing the equivalent of 200 to 1000 parts of natural boron per million parts of cladding material homogeneously disposed throughout the extent of such cladding as a burnable poison to control long-term excess reactivity.

2. A nuclear fuel element comprising an impervious stainless steel cladding, fissionable material encased within said cladding, and said cladding containing 200 to 1000 parts of natural boron per million parts of cladding material homogeneously disposed throughout the extent of such cladding whereby said boron acts as a burnable poison to control long-term excess reactivity.

References Cited in the file of this patent

UNITED STATES PATENTS

| 2,843,539 | Bornstein | July 15, 1958 |
| 2,873,242 | Treshow | Feb. 10, 1959 |

OTHER REFERENCES

Reactor Shielding Manual, edited by Rockwell III, McGraw-Hill Book Co., N.Y. (1956). Page 463.

Nuclear Science and Engineering, vol. 1 (No. 5. Oct. 1956), pages 420, 422, 435, 436. (Article by Zinn et al.)

AECD-3731, Army Package Power Reactor, USAEC report dated Oct. 14, 1955, declassified Nov. 10, 1955; pages 29, 31.